United States Patent [19]

Zielke et al.

[11] 4,137,298

[45] Jan. 30, 1979

[54] PRODUCTION OF A HYDROGEN-RICH GAS FROM A HYDROGEN, CARBON MONOXIDE AND CARBON DIOXIDE-CONTAINING FUEL GAS

[75] Inventors: Clyde W. Zielke, Bethel Park, Pa.; Everett Gorin, San Rafael, Calif.

[73] Assignee: Continental Oil Company, Stamford, Conn.

[21] Appl. No.: 863,025

[22] Filed: Dec. 21, 1977

[51] Int. Cl.$^2$ .............................................. C01B 1/18
[52] U.S. Cl. .............................................. 423/648 R
[58] Field of Search ................................. 423/648 R

[56] References Cited

U.S. PATENT DOCUMENTS 4,067,958  1/1978  Gorin ............................. 423/648 R

OTHER PUBLICATIONS

Zasshi, Journal of the Chemical Society of Japan, Industrial Chemistry Section, 44(5): 385-383, May 1941.

Primary Examiner—O. R. Vertiz
Assistant Examiner—Wayne A. Laugel
Attorney, Agent, or Firm—F. Lindsey Scott; William A. Mikesell, Jr.; D. Leigh Fowler, Jr.

[57] ABSTRACT

In a process for the production of hydrogen-rich gas from a gas containing hydrogen, carbon monoxide, carbon dioxide and other components by contacting the gas in a formate synthesis zone with an aqueous solution containing alkali metal carbonate and/or bicarbonate under conditions effective to produce an effluent aqueous solution containing the corresponding formate and an effluent gas containing the other components of the gas, and thereafter catalytically decomposing the formate in a formate decomposition zone under conditions effective to produce a hydrogen-rich gas and an aqueous solution which contains alkali metal carbonate and/or bicarbonate, the improvement comprising further contacting the gas and the aqueous solution in a catalytic formate synthesis zone prior to decomposing the formate.

8 Claims, 3 Drawing Figures

PRODUCTION OF A HYDROGEN-RICH GAS FROM A HYDROGEN, CARBON MONOXIDE AND CARBON DIOXIDE-CONTAINING FUEL GAS

This invention relates to a process for the production of hydrogen.

This invention further relates to a process for the production of a hydrogen-rich gas from a gas containing hydrogen, carbon monoxide, carbon dioxide and other components normally found in the product of gasification of carbonaceous materials.

It has been proposed previously to produce hydrogen by the reaction of carbon monoxide with alkali metal carbonates and bicarbonates to produce alkali metal formates which are then decomposed to produce hydrogen. In many instances, the gases used as a source of carbon monoxide also contain significant quantities of hydrogen and carbon dioxide. These components of the gas are normally exhausted with the other components of the gas and their fuel value lost unless the other components of the gas are suitable for use as a fuel. In many instances, the hydrogen is not recovered, especially when the hydrogen is present in relatively minor quantities. Since it is particularly desirable that the hydrogen be recovered, a continuing effort has been directed to a search for methods whereby hydrogen could be recovered from the gas which is used to provide the carbon monoxide for the production of hydrogen.

In the practice of the present invention, the hydrogen present in the gas used as a source of carbon monoxide in such processes is recovered by contacting the gas containing the hydrogen and carbon dioxide with an aqueous solution of alkali metal carbonate and bicarbonate in a catalytic reaction zone thereby producing formate from the hydrogen and carbon dioxide present. The formate so produced is then decomposed along with the formate produced by the reaction of carbon monoxide with the alkali metal carbonates and bicarbonates to produce hydrogen. Thus, the hydrogen present in the carbon monoxide-containing stream is recovered.

In the description of the invention, reference will be had to alkali metal carbonates. This term is used to describe alkali metal carbonates, bicarbonates and mixtures thereof. In the aqueous streams referred to, the alkali metal carbonates and bicarbonates normally exist in mixture with varying proportions of each being present. The reactions involving the two materials are substantially the same and the products produced are the same. Therefore, they are treated herein as substantial equivalents and will be referred to hereinafter as alkali metal carbonates unless a particular species is intended.

Suitable gases may be produced from coal, carbonaceous fuels derived from coal, and the like by reaction with steam and air in any convenient manner. Such gas is primarily a mixture of carbon monoxide and nitrogen containing small amounts of carbon dioxide and hydrogen with only traces of methane and oxygen. A typical producer gas made from coke may contain 30% carbon monoxide, 55% nitrogen, 10% hydrogen and 4% carbon dioxide. Other gases which are suitable include those produced by oxygen blown gasifiers, slagging gasifiers and the like which typically contain higher quantities of methane. Clearly a multitude of variations in the method of producing the charge gas are possible, as known to those skilled in the art. Since coal and solid fuels derived therefrom normally contain sulfur, the gases may therefore generally contain $H_2S$ and hence this embodiment of the present invention provides for such presence.

Figure 1:
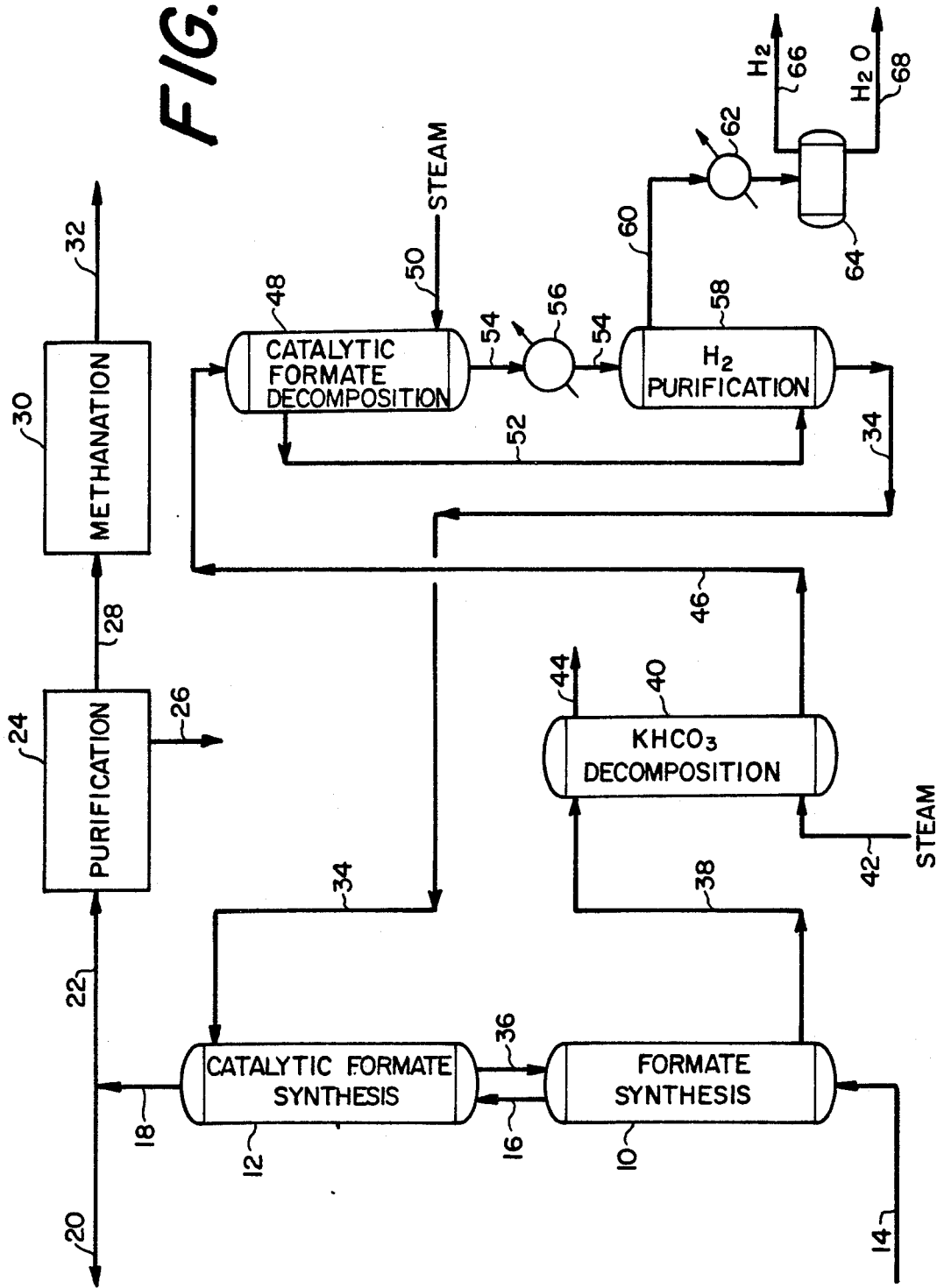
FIG. 1 is a schematic flowsheet of an embodiment of the present invention.

Referring to FIG. 1, a gas containing CO, $CO_2$, $H_2$ and optionally $CH_4$ is introduced into a non-catalytic into a non-catalytic formate synthesis zone 10 via a line 14. An aqueous carbon monoxide-absorbing solution which contains alkali metal carbonate and alkali metal formate is introduced into formate synthesis zone 10 via line 36. Conditions are maintained in formate synthesis zone 10 such that a major portion of the carbon dioxide produced by equations (1) and (2) below is not absorbed but is allowed to escape with the effluent gas.

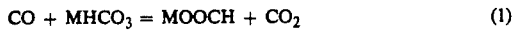
$$CO + MHCO_3 = MOOCH + CO_2 \tag{1}$$

$$2CO + M_2CO_3 + H_2O = 2MOOCH + CO_2 \tag{2}$$

(M is either sodium or potassium.)

Within formate synthesis zone 10, the gas is maintained in intimate contact with the aqueous absorbing solution in a liquid state under conditions effective to separate the carbon monoxide in the gas from the remaining components of the gas by reactions (1) and (2). That part of the hydrogen sulfide which is absorbed in the aqueous solution forms soluble sulfur-containing salts, for example KHS. The desired contact between gas and solution may be by either a countercurrent or co-current flow, although countercurrent flow is preferred in two or more stages. A suitable design comprises a series of gas sparge trays with liquid flowing countercurrent to the gas. The temperature maintained in formate synthesis zone 10 may vary about 400° to about 600° F. with a preferred temperature being from about 425° to about 475° F. and the pressure is suitably maintained from about 20 to about 150 atmospheres with a preferred range being from about 50 to about 100 atmospheres. No catalyst is used in formate synthesis zone 10. Under the foregoing conditions maintained in formate synthesis zone 10, the carbon monoxide is absorbed by the alkali metal carbonate in the aqueous absorbing solution in accordance with reactions (1) and (2) above. This absorption produces an aqueous solution which contains principally alkali metal formate with some unreacted alkali metal carbonates as well as soluble sulfur-containing alkali metal salts, for example KHS. Any nitrogen or methane as well as other components of the gas which are insoluble in aqueous alkali metal carbonate solution are discharged as an effluent gas from the formate synthesis zone through a line 16 through which they pass to a catalytic formate synthesis zone 12. An aqueous alkali metal carbonate solution is introduced into catalytic formate synthesis zone 12 via a line 34 where it flows countercurrently to the gas introduced into catalytic formate synthesis zone 12 via line 16. The reaction conditions in formate synthesis zone 12 are desirably a temperature from about 350° to about 600° F. with a preferred temperature range being from about 400° to about 475° F., and a pressure from about 20 to about 150 atmospheres, although a preferred range for the pressure is from about 50 to about 100 atmospheres.

The gas recovered from zone 12 via line 18 contains those components of the gas charged to zone 10 which are insoluble in the aqueous alkali metal carbonate such as methane, nitrogen, $CO_2$, etc. Dependent upon the composition, i.e. if the gas stream in line 18 contains substantial quantities of $CO_2$ etc., it may be desirable to recycle the stream to the gasifier (not shown) via a line 20. In some instances, it may be desirable to recover $CO_2$ from the stream for recycle to the gasifier. In the event that the gas in line 18 contains substantial quantities of methane, it may be desirable to pass the gas to a purification zone 24 via a line 22 for sulfur removal via a line 26 and the like. The gas is then passed to a methanation zone 30 via a line 28 where the methane content is increased to produce a high Btu gas which is recovered via a line 32. Purification and methanation may include steps such as hydrogenation of sulfur compounds for easier removal, shift reaction to adjust the hydrogen ratio to a value such that $$H_2 = 3\,CO + 4\,CO_2$$

and the like. Such steps are known to those skilled in the art and form no part of the present invention.

The aqueous solution recovered from catalytic formate synthesis zone 12 is passed to the inlet of formate synthesis zone 10 via a conduit 36.

The preferred catalysts for use in formate synthesis zone 12 are catalyst composites having a sulfided metal component of at least one Group VI metal supported on an alkali-resistant carrier. Some suitable carriers are activated carbon, thoria, magnesia, pumice and the like; of those, activated carbon is preferred. Of the Group VI metals, molybdenum disulfide and tungsten disulfide are preferred. Transition group metal sulfides such as NiS, COS, FeS, CuS and the like may be added as promoters. The use of such catalysts in catalytic formate synthesis zone 12 results in the production of formate as shown by reactions (3) and (4) below.

$$MHCO_3 + H_2 = MOOCH + H_2O \tag{3}$$

$$M_2CO_3 + 2H_2 + CO_2 = MOOCH + H_2O$$

(M is sodium or potassium.) \tag{4}

By the use of catalytic formate synthesis zone 12, hydrogen is recovered from the producer gas in the form of formate which results in the ultimate utilization of the hydrogen contained in the gas as a part of the purified hydrogen stream.

The effluent formate-containing aqueous solution leaving formate synthesis zone 10 is conducted by a conduit 38 to an alkali metal bicarbonate decomposition zone 40. In zone 40, the formate containing solution is stripped with steam charged to zone 40 via a line 42 to remove at least a major portion of the MHS (as $H_2S$) and convert at least a major portion of the $MHCO_3$ contained in the solution to $M_2CO_3$ as shown below.

$$MHCO_3 + MHS = M_2CO_3 + H_2S$$

(M is sodium or potassium.) \tag{5}

$$2\,MHCO_3 \rightarrow M_2CO_3 + CO_2 + H_2O$$

(M is sodium or potassium) \tag{6}

Sulfur compounds may also be converted to $H_2S$ in zone 40 as shown below.

$$MHS + MHCO_3 \rightarrow M_2CO_3 + H_2S \tag{7}$$

The $CO_2$ and $H_2S$ produced in zone 40 are recovered via a line 44. Reaction conditions in zone 40 are a temperature from about 200° to about 350° F. and a pressure from about 1 to about 10 atms.

Figure 3:
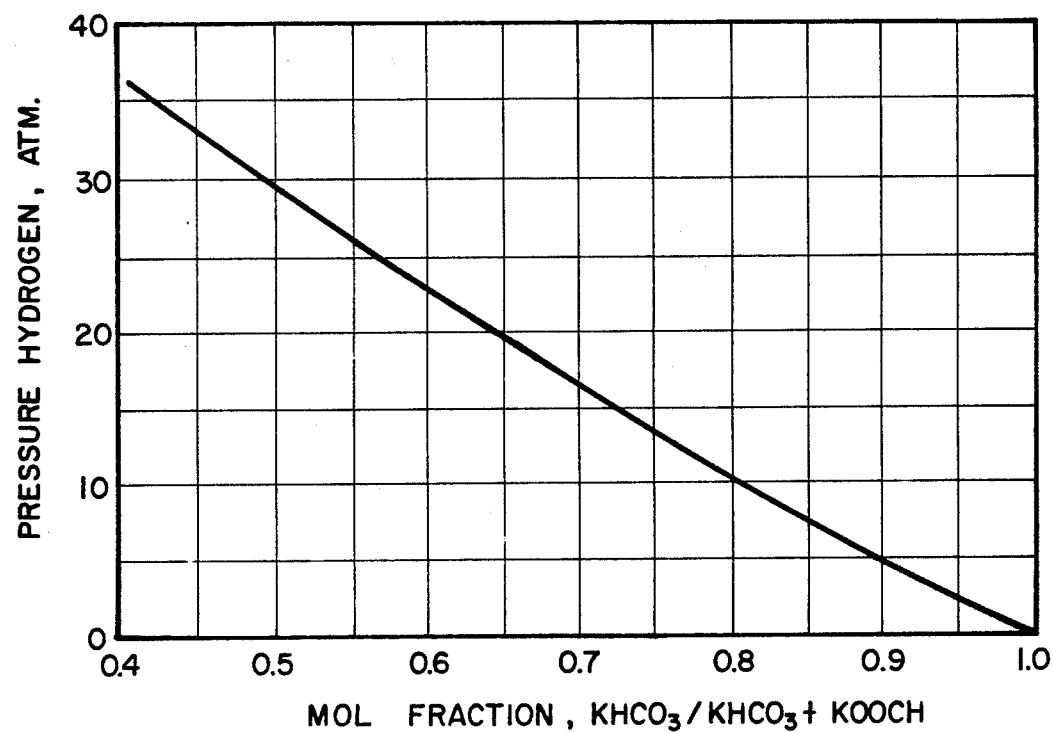
FIG. 3 is a graph showing the equilibrium hydrogen pressure over solutions of $KHCO_3$ and $KOOCH$ as a function of the amount of $KHCO_3$ in the solution.

FIG. 3 shows the variation in the equilibrium hydrogen pressure over a solution of $KHCO_3$ and KOOCH as a function of the mol fraction $KHCO_3$ in the mixture. Clearly the hydrogen pressure is greater when the mol fraction $KHCO_3$ is reduced, thus the production of hydrogen in zone 48 is benefited by the conversion of the $MHCO_3$ to $M_2CO_3$ in zone 40.

The formate-containing solution is then conducted to a catalytic formate decomposition zone 48 via a line 46. In zone 48, the formate-containing aqueous solution is maintained in a liquid state in the presence of a catalyst at an elevated temperature and pressure. Externally generated steam is introduced into zone 48 via a line 50 and preferably is circulated through a trickle-phase fixed bed catalytic system in countercurrent flow relationship to the downwardly moving aqueous formate solution. The use of externally generated steam assures the presence of sufficient water in decomposition zone 48 to maintain all salts in solution thereby avoiding precipitation of salts in the catalyst composite and consequent deactivation. Suitable conditions in zone 48 are temperature from about 350° to about 600° F. with a preferred temperature range being from about 450° to about 525° F., and a pressure from about 20 to about 200 atmospheres, with a preferred pressure range being from about 50 to about 125 atmospheres. The catalysts used in the formate decomposition zone are catalyst composites having a sulfided metallic component of at least one Group VI metal supported on an alkali-resistant carrier. Some suitable carriers are activated carbon, thoria, magnesia, pumice and the like; of these, activated carbon is preferred. Of the Group VI metals, molybdenum disulfide and tungsten disulfide are preferred. Transition Group VIII metal sulfides such as NiS, COS, FeS, CuS and the like may be added as promoters. The use of such catalysts in the formate decomposition zone allows reaction (8) shown below to proceed rapidly.

$$MOOCH + H_2O = MHCO_3 + H_2$$

(M is sodium or potassium.) \tag{8}

As indicated, reaction (8) proceeds under these conditions at a rapid rate at a relatively low temperature with little or no formation of either carbon monoxide or oxalate, thus insuring the maximum production and purity of the desired hydrogen. The regenerated aqueous absorbing solution is removed from formate decomposition zone 48 via a conduit 54. This solution contains principally alkali metal carbonate and bicarbonate as well as undecomposed alkali metal formate. The solution is cooled to a temperature between 300° and 400° F. by means of a suitable heat exchanger 56 positioned in line 54. The cooled solution is then conducted to a hydrogen purification zone 58.

A hydrogen-rich effluent gas which contains a small amount of carbon dioxide is removed from formate decomposition zone 48 via a conduit 52 and conducted to a hydrogen purification zone 58. Hydrogen purification zone 58 is desirably packed with a non-catalytic packing material and the hydrogen-rich effluent gas is desirably passed in countercurrent flow relationship to the downwardly flowing cooled stream of regenerated solution from line 54. Hydrogen purification zone 58 is maintained at a temperature from about 300° to about 400° F. and preferably between 325° and 375° F. and a pressure between 30 and 200 atmospheres and preferably between 50 to 125 atmospheres. At the low temperature of the regenerated solution, carbon dioxide in the hydrogen-rich gas is reabsorbed. As a consequence, an effluent gas is recovered from hydrogen purification zone 58 through a line 60 which consists essentially of hydrogen and water vapor. The latter is condensed by means of a heat exchanger 62 and recovered in a vessel 64 from which water is withdrawn through a line 68 and a gas consisting essentially of hydrogen is withdrawn through a line 66.

Figure 2:
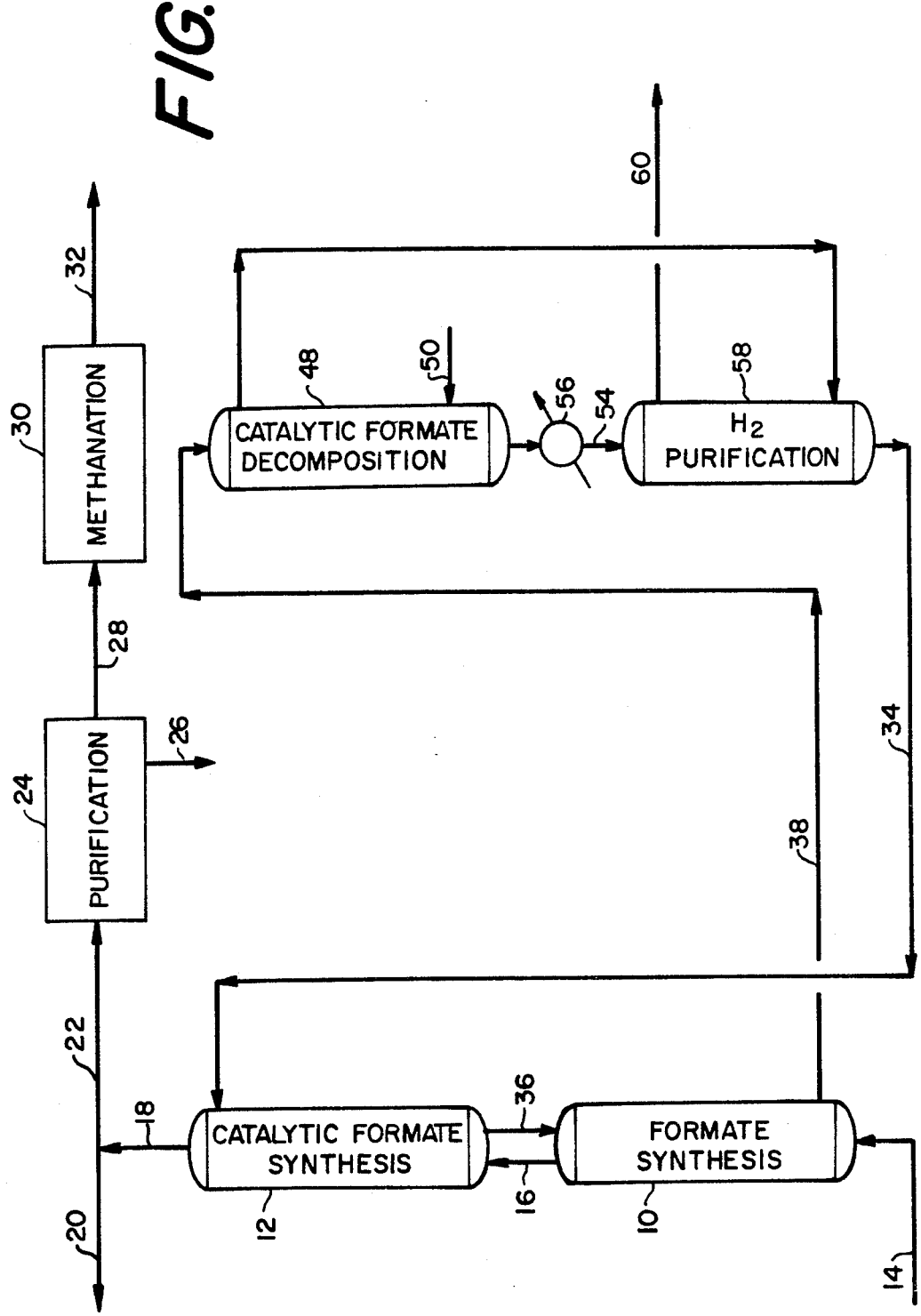
FIG. 2 is a schematic flowsheet of a further embodiment of the present invention.

In FIG. 2, an alternative embodiment of the present invention is shown. The embodiment of FIG. 2 differs from that of FIG. 1 in that no KHCO$_3$ decomposition zone is included. In this embodiment, conditions are adjusted in synthesis zone 10 so that substantially all the alkali metal carbonate and bicarbonate is converted to alkali metal formate. When such is the case, sulfur in the form of MHS is converted to H$_2$S as shown below.

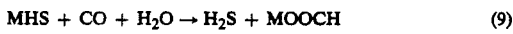

$$MHS + CO + H_2O \rightarrow H_2S + MOOCH \qquad (9)$$

The H$_2$S is recovered from zone 12 via line 18 and passed to sulfur recovery, etc.

Since substantially no MHCO$_3$ remains in the formate-containing stream from zone 10, there is no need for a MHCO$_3$ decomposition zone either to convert MHS to H$_2$S or to convert MHCO$_3$ to M$_2$CO$_3$ and the formate-rich stream is passed directly to decomposition zone 48.

The use of the embodiment of FIG. 2 further differs from practice of the embodiment of FIG. 1 in that in the embodiment of FIG. 2 there is a lesser quantity of M$_2$CO$_3$ in the effluent from decomposition zone 58 than in the embodiment shown in FIG. 1. As a result, the removal of CO$_2$ as shown below

$$M_2CO_3 + CO_2 + H_2O \rightarrow 2\ MHCO_3 \qquad (10)$$

is less complete than in the embodiment of FIG. 1. Accordingly, it is desirable when high purity hydrogen is to be produced, that a subsequent CO$_2$ removal step (not shown) be used to purify the hydrogen-rich stream in line 60.

In a preferred embodiment, the fuel gas used as a feedstock is a producer gas which is manufactured from a solid carbonaceous fuel such as coal, coke, char and the like. The producer gas is readily manufactured in conventional gas producers known to those skilled in the art. The producer gas typically contains about 30% carbon monoxide, 55% nitrogen, 10% hydrogen and 4% carbon dioxide. Clearly, the composition is widely variable within the scope of the present invention. In the practice of the present invention, the salts of sodium and potassium are suitable but potassium is the preferred alkali metal since the salts of potassium are somewhat more soluble than those of sodium. Clearly, either metal could be used if dilute solutions are used but as indicated, the potassium salts are preferred.

In the practice of the present invention, the hydrogen content of the producer gas stream is recovered as a part of the product hydrogen stream rather than as a part of the waste stream. The carbon monoxide absorbing synthesis formate zone 10 does not remove the hydrogen from the producer gas mixture and normally the hydrogen is lost in the practice of such processes. By the improvement of the present invention, such hydrogen is removed as a formate and is readily recovered as a product when the formate produced is decomposed in formate decomposition zone 48. Clearly, the improvement of the present invention results in a superior recovery of hydrogen from producer gas and results in the recovery of fuel values or hydrogen values which would otherwise be lost.

In a further embodiment of the present invention, oxygen or oxygen-enriched air may be used in the gasifier. In some gasifiers, for instance Lurgi gasifiers, substantial amounts of methane may be present in the producer gas. Such methane is of course exhausted through line 18 and may be used as fuel as exhausted, purified to produce high Btu gas or the like. Such variations are known to the art and form no part of the present invention. In instances where the methane content of the exhaust stream is low, it may optionally be recycled to the gasifier.

Having thus described the present invention by reference to certain of its preferred embodiments, it is pointed out that these embodiments are illustrative rather than limiting in nature and that many variations and modifications are possible within the scope of the present invention. It is anticipated that many such variations and modifications may appear obvious and desirable to those skilled in the art upon a review of the foregoing description of preferred embodiments.

Having thus described the invention, we claim:

1. In a process for the production of a hydrogen-rich gas from a fuel gas containing hydrogen, carbon monoxide, carbon dioxide and nitrogen or methane or both, said process consisting essentially of:
   (a) contacting said fuel gas with an aqueous absorbing solution which contains at least one compound selected from the group consisting of sodium carbonate, sodium bicarbonate, potassium carbonate, potassium bicarbonate and mixtures thereof in a non-catalytic reaction zone under formate synthesis conditions of a temperature in the range of about 400° to about 600° F. and a pressure in the range of 20 to 150 atmospheres, whereby carbon monoxide is reacted with said compound to produce an aqueous solution which contains principally formate, and thereafter
   (b) heating the aqueous formate-containing solution produced in step (a) in contact with a catalyst composite containing at least one metallic component selected from Group VI and Group VIII metals, their oxides and sulfides supported on an alkali resistant carrier at formate decomposition conditions of temperature in the range of 350°-600° F. and a pressure in the range of 20-200 atmospheres, whereby the formate in the aqueous formate-containing solution decomposes to produce a hydrogen-rich gas while regenerating said aqueous absorbing solution, and thereafter passing said aqueous absorbing solution to step (a), the improvement comprising countercurrently contacting said fuel gas from step (a) from which CO has been removed with fresh aqueous absorbing solution in a catalytic reaction zone with a catalyst composite comprising at least one metallic component selected from Group VI metals, their oxides and sulfides supported on an alkali-resistant carrier under formate synthesis conditions of a temperature in the range of about 350° to about 600° F. and a pressure in the range of about 20 to about 150 atmospheres whereby hydrogen and carbon dioxide are reacted with said compound to produce formate, and passing the resultant aqueous absorbing solution containing formate to step (a) to produce said formate-containing solution for decomposition in step (b).

2. The process of claim 1 wherein said fuel gas is selected from the group consisting of water gas, synthesis gas and producer gas.

3. The process according to claim 2 wherein said fuel gas is producer gas.

4. The process of claim 1 wherein said temperature in said catalytic reaction zone is from about 400° to about 475° F. and wherein said pressure in said catalytic reaction zone is from about 50 to about 100 atmospheres.

5. The process of claim 1 wherein the catalyst composite used in said catalytic reaction zone comprises at least one sulfided metallic component selected from Group VI supported on active carbon.

6. The process of claim 5 wherein said catalyst is molybdenum sulfide supported on active carbon.

7. A process for the production of a hydrogen-rich gas from a producer gas containing hydrogen, carbon monoxide, carbon dioxide, methane and nitrogen, said process consisting essentially of:

(a) making a producer gas from a solid carbonaceous fuel;

(b) countercurrently contacting said producer gas with an aqueous solution which contains alkali metal formate and at least one compound selected from the group consisting of $NaHCO_3$, $Na_2CO$, $KHCO_3$, $K_2CO_3$ and mixtures thereof under formate synthesis conditions of temperature in the range of 400°–600° F., and a pressure in the range of 20 to 150 atmospheres whereby carbon monoxide is absorbed by said aqueous solution to produce an aqueous formate-containing solution and a gas stream having a reduced carbon monoxide content;

(c) countercurrently contacting said gas stream having a reduced carbon monoxide content with fresh aqueous absorbing solution containing at least one compound selected from the group consisting of $NaCO_3$, $NaHCO_3$, $K_2CO_3$, $KHCO_3$ and mixtures thereof in a catalytic reaction zone with a catalyst composite comprising at least one metallic component selected from Group VI metals, their oxides and sulfides supported on an alkali-resistant carrier at a temperature from about 350° to about 600° F. and a pressure from about 20 to about 200 atmospheres whereby carbon dioxide and hydrogen in said gas stream react with said compound to form said aqueous solution which is thereafter passed to step (b);

(d) treating said aqueous formate-containing solution from step (b) with steam in the presence of a catalyst composite comprising at least one metallic component selected from Group VI metals, their oxides and sulfides, supported on an alkali-resistant carrier at formate decomposition conditions of a temperature in the range of about 350 to about 600° F., and a pressure in the range of about 20 to about 150 atmospheres whereby the alkali metal formate in the solution decomposes to produce a hydrogen-rich gas while regenerating said aqueous absorbing solution;

(e) recycling said aqueous absorbing solution from step (d) to step (c) to absorb more carbon dioxide and hydrogen from said gas stream; and (f) withdrawing hydrogen-rich gas from step (d).

8. The process of claim 7 wherein said hydrogen-rich gas and said aqueous absorbing solution from step (d) are contacted at a temperature in the range of 400°–475° F. and a pressure of 50–100 atmospheres to reabsorb carbon dioxide present in said hydrogen-rich gas to thereby produce high purity hyrogen-rich gas.

* * * * *

UNITED STATES PATENT OFFICE
CERTIFICATE OF CORRECTION

PATENT NO. : 4,137,298
DATED : January 30, 1979
INVENTOR(S) : Clyde W. Zielke & Everett Gorin It is certified that error appears in the above-identified patent and that said Letters Patent are hereby corrected as shown below:

Col. 2, line 13: Delete "into a non-catalytic".

Signed and Sealed this

Twenty-ninth Day of May 1979

[SEAL]

Attest:

RUTH C. MASON
Attesting Officer

DONALD W. BANNER
Commissioner of Patents and Trademarks